United States Patent Office 2,705,215
Patented Mar. 29, 1955

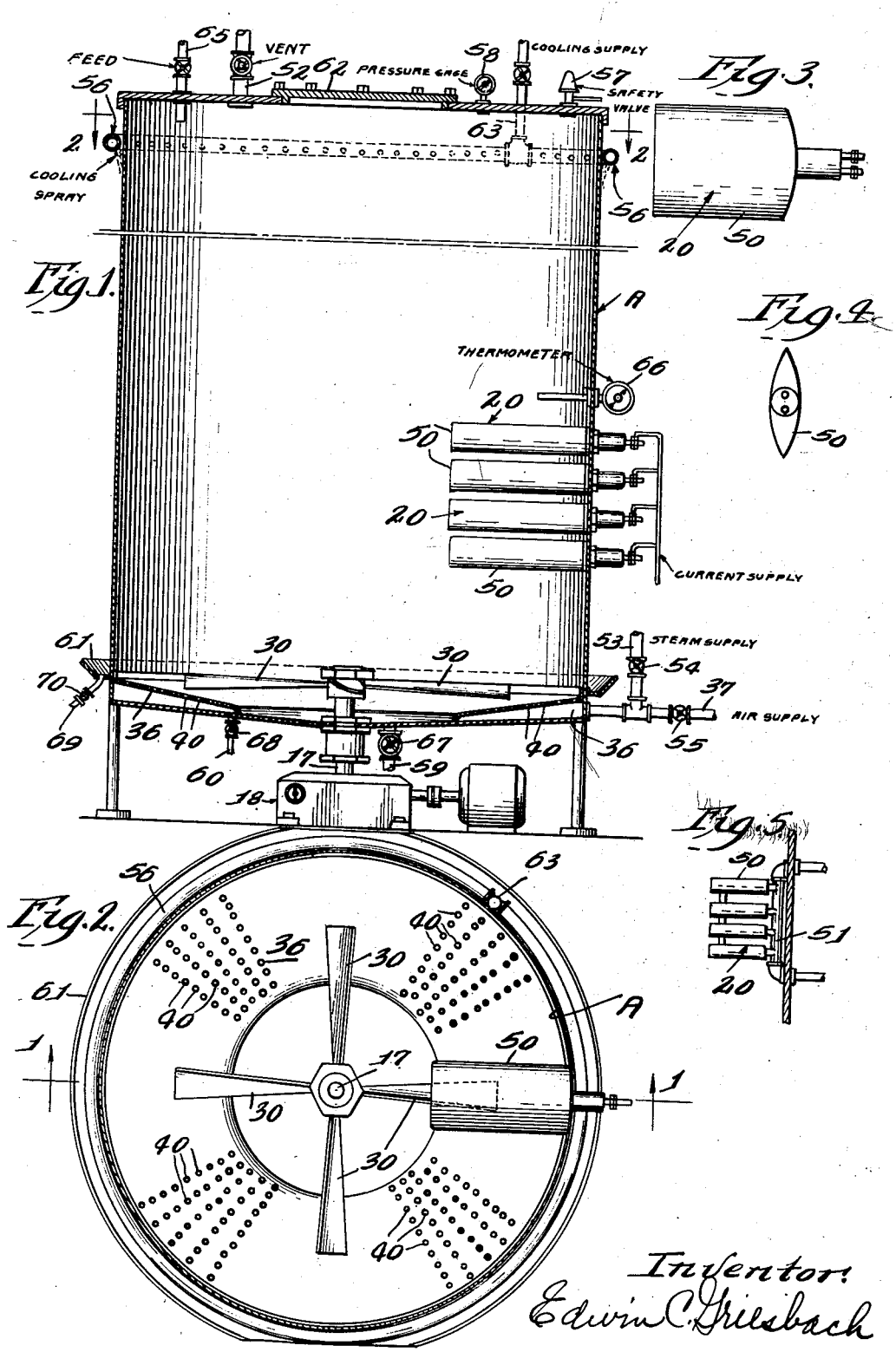

2,705,215

METHOD OF TEMPERATURE CONTROL FOR THE GROWTH OF MICRO-ORGANISMS

Edwin C. Griesbach, Oak Park, Ill.

Application May 8, 1951, Serial No. 225,225

4 Claims. (Cl. 195—125)

This application is a continuation in part of my co-pending applications Serial No. 727,307, filed February 8, 1947, for Manufacture of Yeast and Alcohol, now abandoned, and Serial No. 725,933, filed February 1, 1947, now abandoned, for Method of Temperature Control for Fermentation.

The present invention relates to an improved method of temperature control for the growth of micro-organisms, especially vegetable micro-organisms such as yeasts, molds and bacteria.

There are many industries requiring the production of relatively large quantities of micro-organisms; as for example, yeasts, molds and bacteria for the following purposes: products of fermentation, manufacture of breadstuff, pharmaceutical ingredients and warfare.

The chief object of the present invention is to provide a method of temperature control which is more favorable to the growth of micro-organisms and results in greater yields relative to a given amount of material.

Additional objects, features and advantages of the invention disclosed herein will be apparent to persons skilled in the art after the method thereof is understood from the within description.

According to the present invention a culture of the organisms, in a fluid state, is circulated in a manner to be heated in little by little portions for short intervals to temperatures far above the normal-generative degree while the culture is maintained for the most part at a normal temperature for the growth of the micro-organisms by sufficiently cooling the culture so as to maintain it for the most part at a normal-generative temperature.

If required, and this is advantageous in most cases, heat is intermittently applied according to the invention, during the usual periods of cell growth cessation. The most favorable degree of temperature exposure is different for different organisms therefore I have found it beneficial in each case to regulate the temperature increase of the successive small portions by adjusting the temperature introduction and/or the duration of exposure to suit the particular organisms. In the present method there appears to be benefits as the heat subjection is increased to a certain extent, however a limit is reached when the temperature approaches the enzyme destructive point. I have found it advantageous in most cases to increase the localized heated portions to an intensity of about 145° F.

Thus the circulating inoculated-nutrient medium while maintained substantially throughout at a normal-generative temperature by cooling the excess cumulative heat, is heated in successive small portions, or in a little by little manner, to a relatively intense temperature which imparts a transient high heat to the small portions and results in localized transient or abruptly temperature changes which however is of insufficient volume to substantially affect the over-all temperature of the inoculated-nutrient medium.

It is likely that the reasons for the beneficial results with the application of the present invention cannot be unmistakably nor entirely determined, although, while contributing factors are included in the following; I desire it to be understood that my invention is not to be limited in any way by these explanations: activation of beneficial enzymes at temperatures above the normal-generative degree; a more perfect dissemination of cell clusters; softening of the cell structure, resulting in an accelerated generation; an improved cell permeability, resulting in improved osmosis; greater decomposition of nutrient materials, resulting in a more assimilable medium; and thermal destruction of parasitic micro-organisms.

Quite obviously the equipment and exact method used to effect the present invention can vary greatly, such as, size and proportion of the vessel; construction and temperature of the heat exchange means; whether the heat-exchange means is in motion or the culture circulated to a stationary heat-exchange means; means for the circulation of the culture; means for dissipating the substantially over-all accumulative heat; and if aeration is used, its temperature and proximity to the heat-exchange means.

In the practice of this invention I have found it advantageous to slowly revolve the culture with the use of an impeller in a manner to transiently contact a relatively small and intensely heated heat-exchange means.

On the accompanying drawing there is shown apparatus which is to be understood as being of a schematic character merely for the purpose of illustrating suitable equipment for the practice of the present invention, Fig. 1 is a sectional view of a vat or vessel having disposed therein an electrical resistance heat-exchange device;

Fig. 2 is a top plan view of the mechanism depicted in Fig. 1 and being taken substantially on the plane of the line 2—2 in Fig. 1;

Fig. 3 is a top view of the heat-exchange device depicted in Fig. 1;

Fig. 4 is an end view in part of the heat-exchange device depicted in Fig. 1;

Fig. 5 is merely a modification of the heat-exchange device wherein a fluid medium may be used for heat introduction.

As illustrative of a method to utilize the present invention wherein yeast is propagated, a dilute solution was prepared containing a carbohydrate in the form of sugar with additions of suitable amounts of nitrogen and phosphorus-containing yeast-nutrient materials, such as ammonium phosphate, ammonium sulphate and cereal extract. This yeast-nutrient medium then being seeded with a suitable amount of yeast of the species Saccharomyces cerevisiae, thoroughly aerated at a temperature of about 60° F. for the duration of the process, the temperature of the batch maintained for the duration of the process at least for the most part throughout at a normal-propagative degree of about 70° F.–90° F. while being slowly revolved with a peripheral speed of about 13 feet per minute by adjusting the variable speed control drive mechanism such as depicted on the drawing at 18 operatively connected to an impeller such as depicted on the drawing at 30 was transiently brought in contact with a heat-exchange device such as depicted on the drawing at 20. The heat-exchange device has a width of about 3 inches, a maximum thickness of about ½ inch and providing a heated surface of about 1–2 inches per gallon of culture with heat introduced by an electrical resistance element packed in tubing with magnesium oxide commonly known as a "Cal" rod having an electrical characteristic of approximately 2000 watts per lineal foot extending lengthwise into the fermentation vessel thereby providing transient heat to the culture at temperatures of about 110° F.–145° F. while the dissipation of cumulative heat for the most part over-all was effected by coolant means such as depicted on the drawing at 56. This localized heat was applied as above described for about 3 hours, or more precisely until the yeast entered a period of generation. After this period of generation had subsided heat was again applied until the next yeast budding cycle when because of its accompanying fermentation heat the applied heat was again stopped; this procedure being repeated for the duration of the process including the yeast ripening period during which the heat resulting from fermentation had again subsided. In a batch with like materials and otherwise identical conditions, by the use of the above described method of temperature control increases in yeast yields amounting to more than 10% have been obtained, such yeast having unimpaired quality.

It will of course be understood that while the exact mode of effecting the invention defined is practicable the invention is not limited strictly thereto, as departures may be made as circumstances require and since yeast propagation can be carried out with many different processes and materials without departing from the scope of the invention it is intended that all matter contained in the above description shall be interpreted as illustrative and not in any limiting sense. Also, while a heat-exchange means of the above described capacity gives good results its characteristics may be broadly varied to accord with varying conditions and similarly the speed of movement of the yeast-nutrient medium can be regulated which obviously results in a correspondingly different degree of temperature exchange. In addition, other means for the production of localized heat, the circulation of the culture and the cooling of accumulative heat substantially throughout the culture, may be utilized.

Having now described my invention, I claim:

1. A method of temperature control for the growth of vegetable micro-organisms wherein, prior to completion of the culture of micro-organisms, the temperature is intermittently elevated above 90° F. in successive small portions of the culture by their exposure to a heat-exchange means and then the small portions are mixed into the remaining larger portion of the culture, said method includes the following improvement: at the same time maintaining the temperature of said remaining larger portion of the culture at a range of about 70° F.–90° F. by exposing it to a heat-exchange means in a manner to cool cumulative heat in said remaining larger portion which is caused, at least in part, by therein mixing said successive small portions.

2. A method of temperature control for the growth of vegetable micro-organisms wherein, prior to completion of the culture of micro-organisms, the temperature is intermittently elevated above 90° F. in successive small portions of the culture which are then mixed into the remaining larger portion of the culture, said method includes the following improvement: at the same time maintaining the temperature of said remaining larger portion of the culture at a range of about 70° F.–90° F. by therein cooling cumulative heat which is caused, at least in part, by mixing said successive small portions into said remaining larger portion of the culture.

3. A method of temperature control for the growth of vegetable micro-organisms wherein, prior to completion of the culture of micro-organisms, the temperature of the culture is controlled with the employment of localized differentiation of temperature, said method includes the following improvement: intermittently elevating the temperature above 90° F. in successive small portions of said culture by exposing them to a heat-exchange means then mixing the successive small portions into the remaining larger portion of said culture which at the same time is being maintained at a temperature range of about 70° F.–90° F. by exposing it to a heat-exchange means in a manner to cool cumulative heat in the larger portion which is caused, at least in part, by thereinto mixing the successive small portions.

4. A method of temperature control for the growth of vegetable micro-organisms wherein, prior to completion of the culture of micro-organisms, the temperature of the culture is controlled with the employment of localized differentiation of temperature, said method includes the following improvement: intermittently elevating the temperature above 90° F. in successive small portions of said culture then mixing them into the remaining larger portion of said culture which at the same time is being maintained at a temperature range of about 70° F.–90° F. by therein cooling cumulative heat which is caused, at least in part, by mixing the successive small portions into the remaining larger portion of said culture.

References Cited in the file of this patent

UNITED STATES PATENTS

| | | |
|---|---|---|
| 1,673,735 | Corby | June 12, 1928 |
| 1,808,593 | Clark | June 2, 1931 |
| 2,146,326 | Bergius et al. | Feb. 7, 1939 |

OTHER REFERENCES

Pratt et al.: Antibiotics, 1951, Lippincott, page 37.